(12) United States Patent
Kux

(10) Patent No.: US 7,575,318 B2
(45) Date of Patent: Aug. 18, 2009

(54) EYEGLASS ASSEMBLY

(76) Inventor: George Kux, 154 Portview Road, Port Perry, Ontario (CA) L9L 1B4

( * ) Notice: Subject to any disclaimer, the term of this patent is extended or adjusted under 35 U.S.C. 154(b) by 0 days.

(21) Appl. No.: 11/956,737

(22) Filed: Dec. 14, 2007

(65) Prior Publication Data

US 2008/0239233 A1 Oct. 2, 2008

Related U.S. Application Data

(60) Provisional application No. 60/909,177, filed on Mar. 30, 2007.

(51) Int. Cl.
*G02C 9/00* (2006.01)
(52) U.S. Cl. .................... 351/47; 351/57; 351/116; 351/153; 16/228
(58) Field of Classification Search ............... 351/47, 351/48, 57, 58, 44, 153, 158, 116, 111; 16/228
See application file for complete search history.

(56) References Cited

U.S. PATENT DOCUMENTS

| 5,416,537 | A | | 5/1995 | Sadler | |
|---|---|---|---|---|---|
| 5,642,177 | A | * | 6/1997 | Nishioka | 351/47 |
| 5,786,880 | A | * | 7/1998 | Chao | 351/41 |
| 6,217,170 | B1 | * | 4/2001 | Hsiao | 351/153 |
| 6,866,385 | B2 | | 3/2005 | Madison | |
| 6,883,912 | B1 | | 4/2005 | Madison | |
| 7,040,751 | B2 | | 5/2006 | Madison | |
| 7,108,371 | B1 | | 9/2006 | Hergan | |
| 7,278,731 | B2 | * | 10/2007 | Madison | 351/47 |
| 2006/0126006 | A1 | * | 6/2006 | Smith | 351/47 |
| 2007/0236652 | A1 | * | 10/2007 | Lee et al. | 351/47 |

\* cited by examiner

*Primary Examiner*—Hung X Dang
(74) *Attorney, Agent, or Firm*—Andrus, Sceales, Starke & Sawall, LLP

(57) ABSTRACT

An eyeglass assembly includes a lens holding "base-frame" with two temples pivotally attached and extending rearward; this "base-frame" is grooved to hold prescription, reading or sunglass lenses. This "base-frame" marries with various lens-holding front-frames enhancement components. The additional front-frame components have the option of holding prescription, reading or sunglass lenses; or can be used with generic colorized lenses, strictly as a "fashion" statement.

The base-frame and front-frame enhancement components utilize magnetized ultra-thin special "rare earth" magnetic materials. This material is embedded and concealed in between laminated layers of plastic. These frame enhancement components are self-aligning when attached, and cling securely to the base-frame front with no visible appendages apparent or showing.

1 Claim, 3 Drawing Sheets

US 7,575,318 B2

EYEGLASS ASSEMBLY

CROSS-REFERENCE TO RELATED APPLICATIONS

This application relates to and claims priority from U.S. Provisional Application Ser. No. 60/909,177 filed Mar. 30, 2007.

BACKGROUND OF THE INVENTION

The present invention relates to an eyeglass assembly, more particularly a component lens-holding frame system. This frame system is comprised of a "base-frame" that has instantly attachable, interchangeable "front-frame" components. This component-eyeglass system has two facets: (1) functionality—the flexibility to convert a prescription eyeglass to sunglass, reader to a sunglasses, sunglass to a readers or prescription; plus colorized lens applications; (2) aesthetically—the frame has a "clean" look, because there are no visible appendages showing, thus creating certain fashion flexibilities from several aspects—changing the general look by size, shape, color, texture, stones, patterns, etc.

Eyeglasses with a duo purpose have been marketed utilizing standard eyewear frames that have an attachable "clip-on" sunglass component for the front of the frame. They are all secured by incorporating "magnets" and wire appendages that remain exposed, thus detracting greatly from the overall aesthetics, limiting the degree of overall fashion styling.

A number of U.S. patents show the use of magnets and/or wire securing appendages. Currently all the eyeglass systems being utilized have "exposed" magnetic connectors and wire appendages that do not allow for higher-fashion styling enhancements or modifications of—shape, color, texture, pattern, etc.

It is therefore extremely desirable to provide a functionally and aesthetically fashionable eyeglass/sunglass/reader system that hides all the connecting magnets, securely mounts magnetically, is self-aligning, and requires no appendages for extra stability.

BRIEF SUMMARY OF THE INVENTION

An eyeglass assembly that includes a lens-holding "base-frame" having 2 L-Joints with temple extensions pivotally attached and extending rearwardly. This lens holding base-frame is grooved to hold prescription, progressive prescription, reading or sunglass lenses. The "magnets" are embedded/counter-sunk into the material on the back front-portion of the base-frame or affixed to the L-Joint that fits through a cut-out on the outer edge of the metal front-portion of the base-frame, then secured to the front-portion of the base-frame utilizing two screws. When the temple L-Joint is attached, through bonding, fusing or screws, is completely hidden from site with no visible magnets or appendages showing.

The base-Frame marries with various lens-holding frame-fronts enhancement components. Additional front-frame has the option of holding prescription, reading or sunglass lenses; or can be used without lenses, strictly as a "fashion" statement. Front-frame enhancement components are designed in an array of various different colors, patterns and shapes that are instantly interchangeable by the wearer.

The "front" enhancement components have magnets embedded in between the laminated, decorative layer of material on the front outer-edge portion area of the frame, utilizing ultra-thin, special "rare earth" magnetic materials. These frame enhancement components magnetically "cling" securely to the base-frame, self-aligning, with no visible magnets and/or appendages showing.

This eyeglass assembly system creates an overall "complete" frame system; permitting easy and instant interchangeability of various frame-enhancement components. This allows for easy and instant modification in three forms: (1) functionality—the flexibility to convert a prescription eyeglass to progressives or sunglasses; reader to sunglasses or progressive prescription; sunglass to readers or prescription progressives; plus colorized lens applications; (2) aesthetically—the frame has a "cleaner" look, because there are no visible magnets or wire appendages showing; (3) fashion utility wise—allows and provides certain fashion flexibilities from several aspects—changing the general look of the frame by size, silhouette/shape, color, texture, stones, patterns, etc.

BRIEF DESCRIPTION OF THE SEVERAL VIEWS OF THE DRAWINGS

The drawings illustrate the best mode presently contemplated of carrying out the present invention. In the drawings.

DETAILED DESCRIPTION OF THE INVENTION

Figure 1:
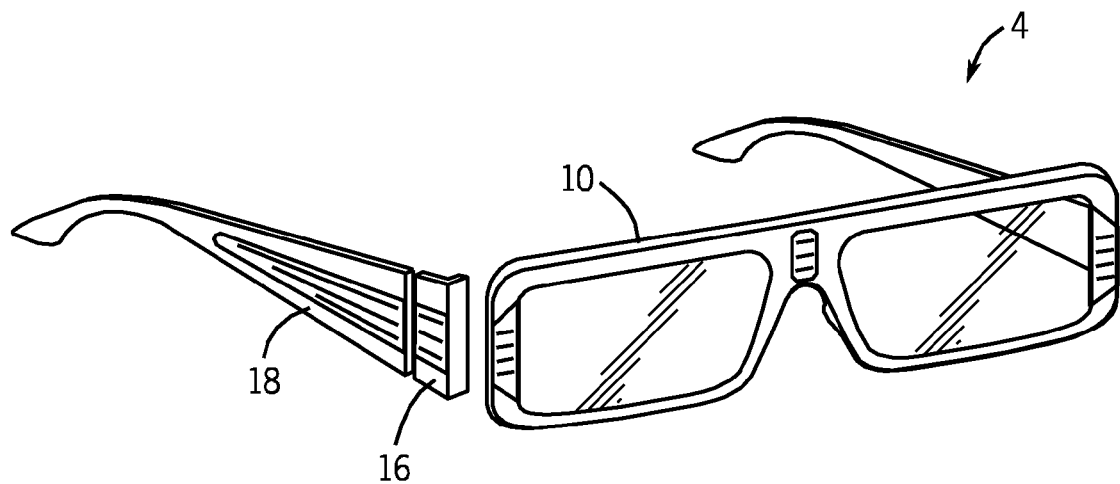
FIG. 1 is a perspective view of the components embodied in the base-frame.
Figure 2:
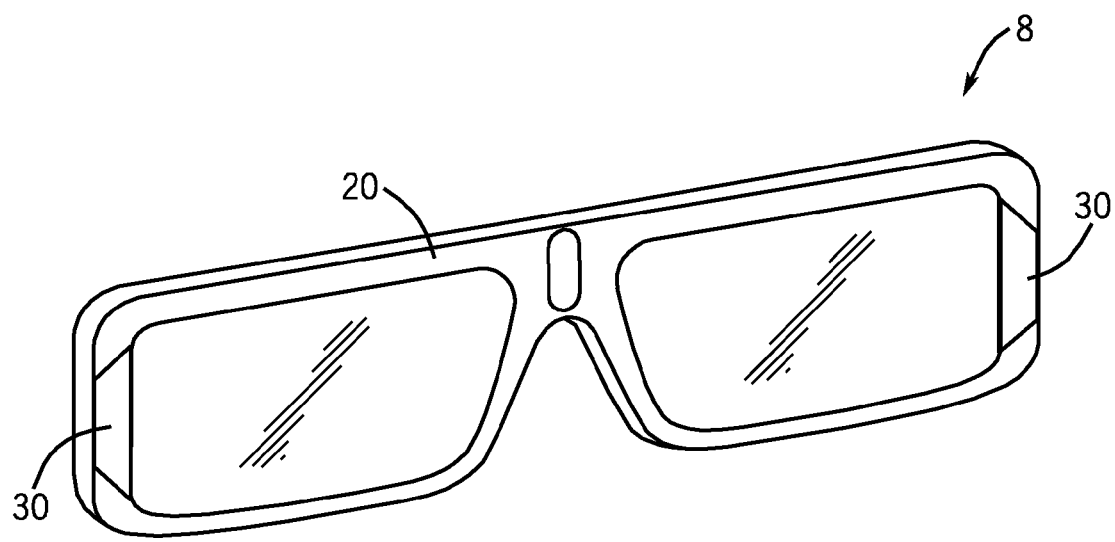
FIG. 2 is a perspective view of the front-frame components.

As seen in FIG. 1, an eyeglass or sunglass embodiment assembly 4 consists of a base-frame front 10, two L-Joint extensions 16 on the left/right, and two temple extensions 18 on the left/right, that are pivotally attached to each of L-Joints 16 with a standard spring-hinge that extends rearward. The base-frame embodiment 4 marries with a variety of front-frame components 20 as seen in FIG. 2.

Figure 3:
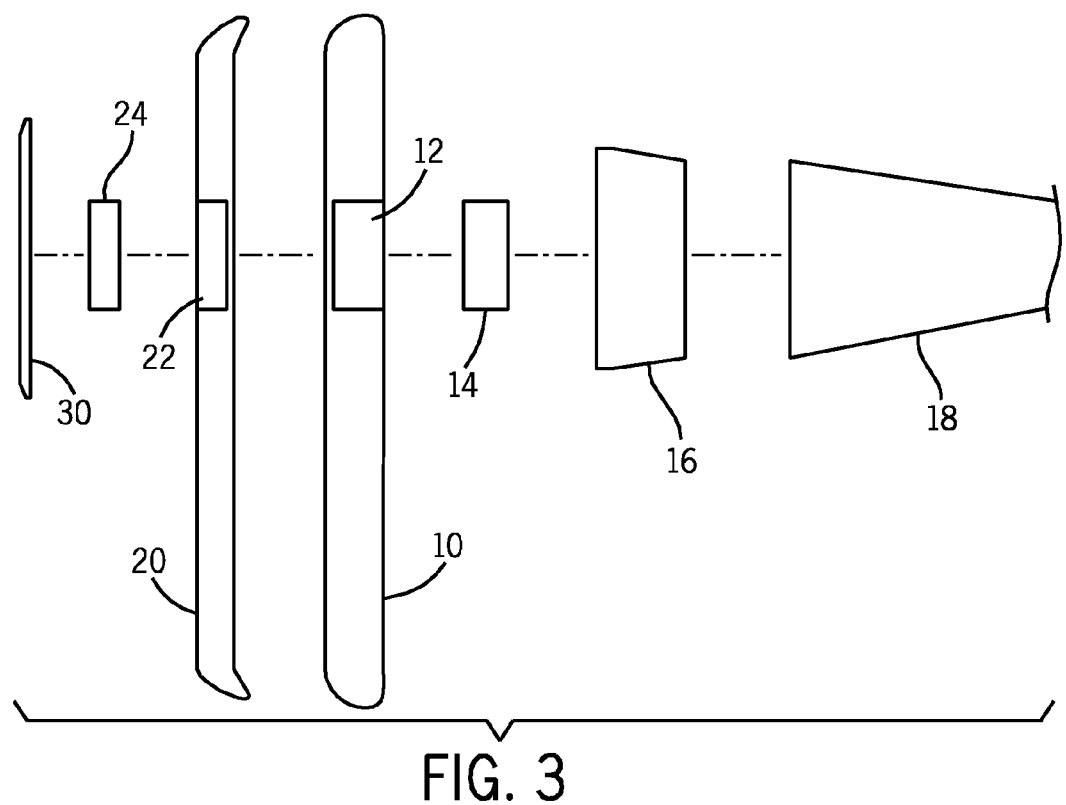
FIG. 3 is an exploded side view of the "frame system;"
Figure 4:
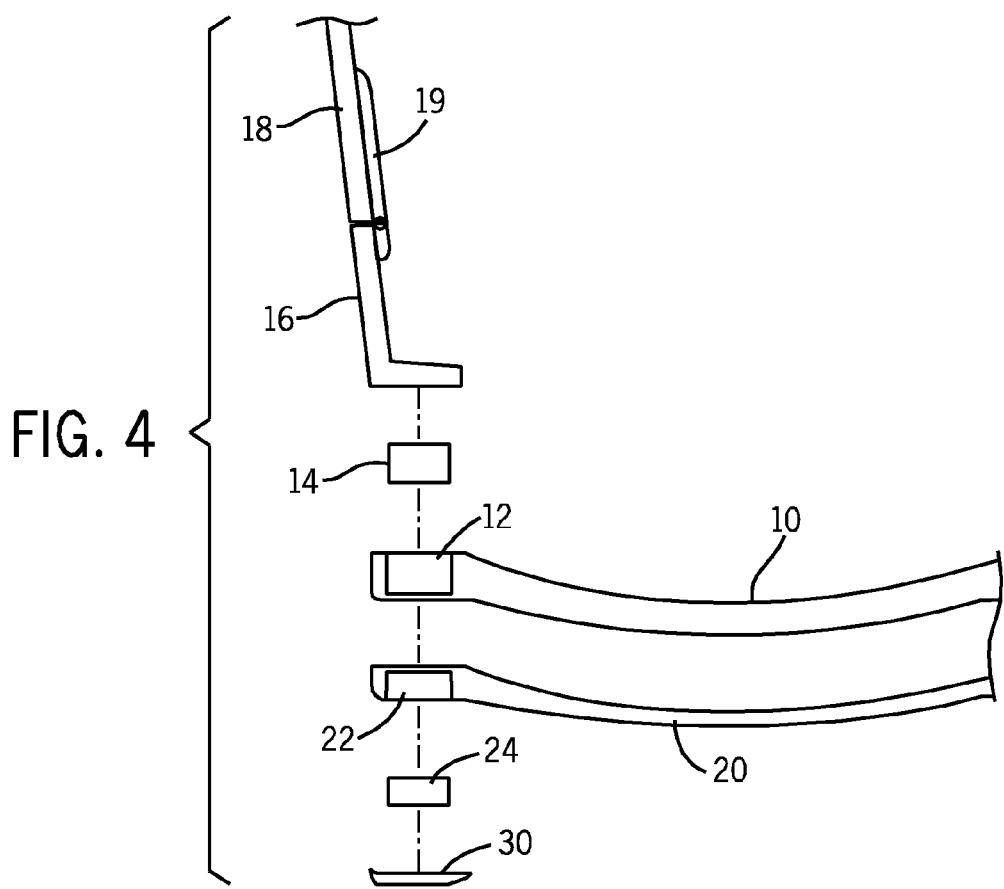
FIG. 4 is a top exploded view of the combined "frame system;"

As seen in FIGS. 3 and 4, base-frame front 10 has ultra-thin magnetic material 14 embedded in the plastic from the back-side, in cavity 12 at the outside edge of the temple-area where the L-Joints 16 are attached. When the L-Joints are laminated/bonded to the front piece 10, the magnetic material becomes completely hidden from sight. The magnetic-attraction created is strong enough so as to not require any additional wire appendages to secure or support the front-frame component 20 and is self-aligning.

As seen in FIG. 3, front-frame piece 20 has ultra-thin magnetic material 24 embedded in the plastic from the front-side, in cavity 22 at the outside edge of the front component. A "decorative" cap 30 is laminated/bonded to the front-frame component 20 and covers and completely hides the magnetic material from sight on both the left/right sides of the front component enhancement piece. The front component's magnetic-attraction to the base-frame allows it to self align and is strong enough so as to not require any additional wire appendages to secure or support.

Figure 5:
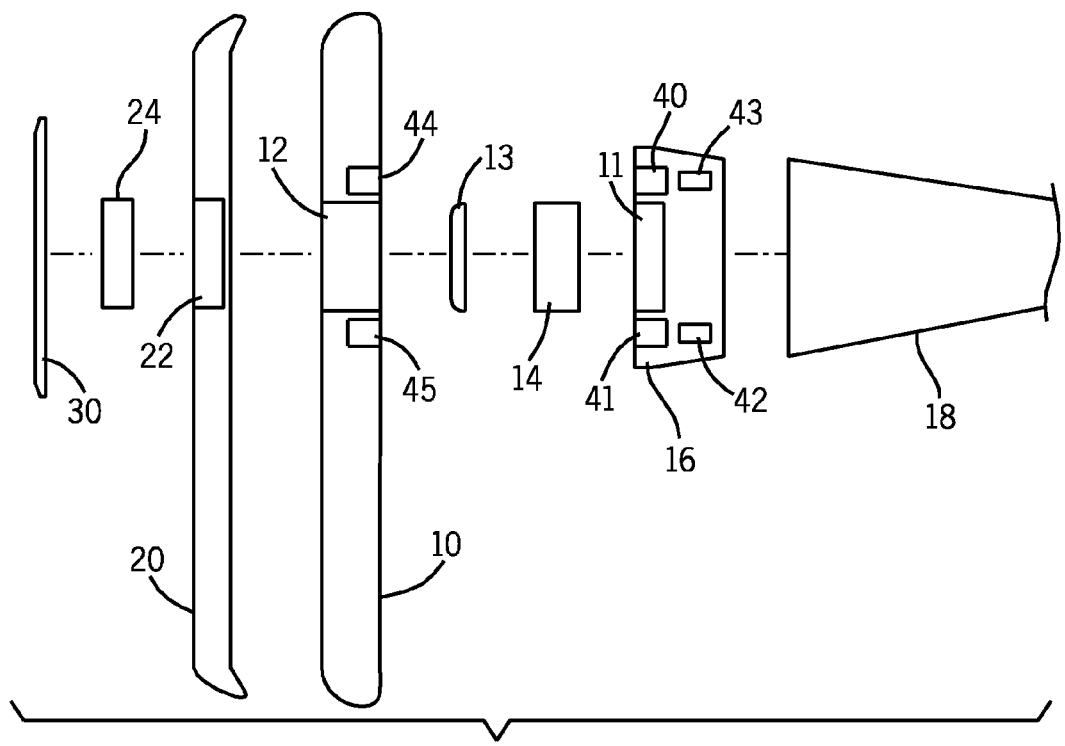
FIG. 5 is a side exploded view of the frame system with temple extensions.
Figure 6:
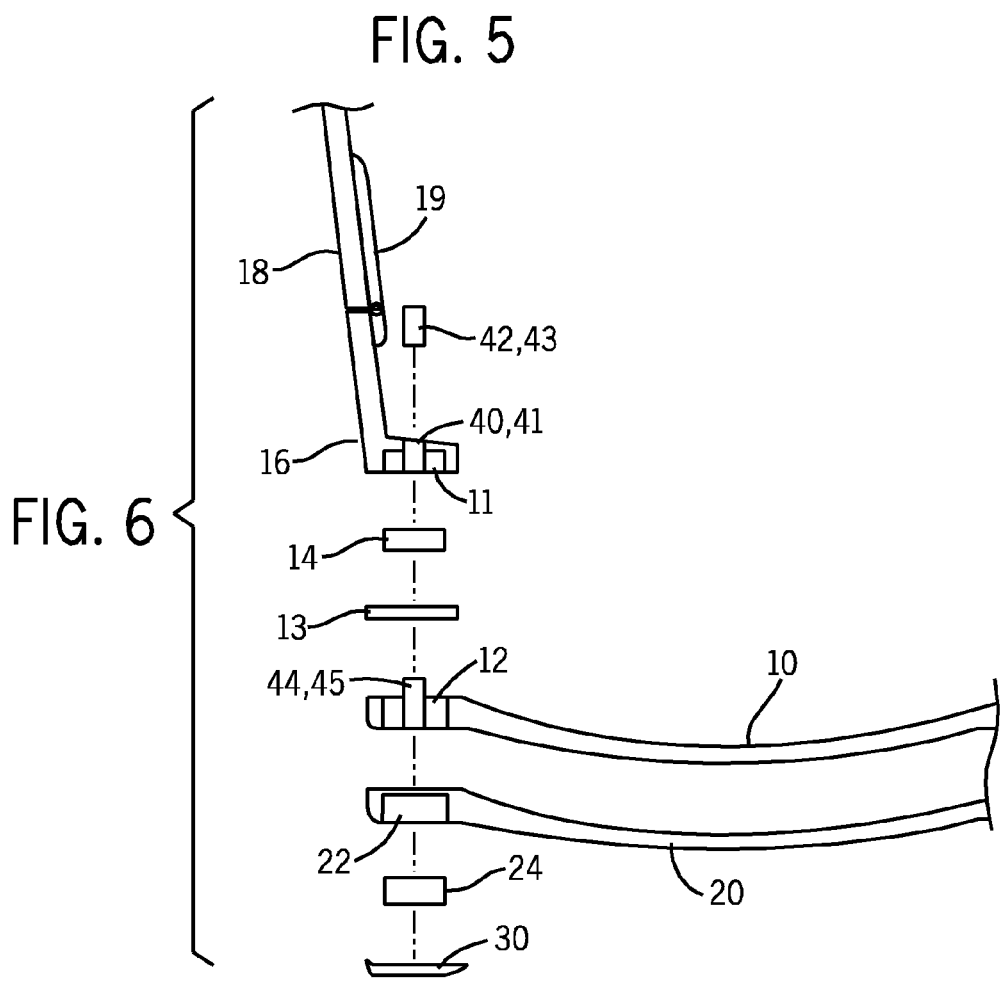
FIG. 6 is a top exploded view of the frame system with temple extensions.

As seen in FIG. 5, base-frame front 10 has ultra-thin magnetic material 14 embedded into L-Joint magnet cavity 11 in the front of L-Joint 16. Decorative magnet cap 13 is laminated/bonded to cover the L-Joint magnetic material. This decorative magnetic cap completely hides magnetic component 14 from sight. The L-Joint has two screw-holes 40-41. Utilizing two screws 42-43, the L-Joint with temple extension is attached by screwing to the front of the metal base-frame into screw-receptors 44-45.

In between the screw receptors is magnet "window" cavity 12. The L-Joint with embedded magnetic component 14 covered by the decorative magnet cap 13 fits through "window" cavity 12 and the decorative cap appears to be on the front surface of the base-frame as a decorative temple piece. Therefore, the covered magnetic material is completely hidden from visible sight. This becomes a magnetically strong mounting element that is self-aligning, requiring no additional wire appendages to secure the front-frame component 20.

As illustrated by the diagram and figures, the frame system has front-frame attachment components having similar shapes with different patterns and colors. The present invention thus provides for same shape, as well as varied front-frame lens holding components of differing dimensions.

Various alternatives and embodiments are contemplated as being within the scope of the following claims particularly pointing out and distinctly claiming the subject matter regarded as the invention.

What is claimed is:

1. An eyeglass assembly comprising:
   a primary plastic frame for holding a first pair of lenses and having a first pair of magnets, each said first magnets is fully embedded and concealed at each end of said primary frame and said primary frame having a front surface and a back surface;
   an auxiliary plastic frame for holding a second pair of lenses and having a second pair of magnets, each said second magnets is fully embedded and concealed at each end of said auxiliary frame and said auxiliary frame having a front surface and a back surface, wherein said second pair of magnets are aligned with said first pair of magnets so that said back surface of said auxiliary frame is magnetically mounted to said front surface of said primary frame;
   a pair of L-shaped joints, each of said L-shaped joints having a third magnet, each of said third magnet is fully embedded and concealed at one end of each said L-shaped joint for magnetically releasably attaching to said back surface of said primary frame, and
   a pair of temples, each of said temples is hingedly attached to other end of said each said L-shaped joint.

* * * * *